United States Patent [19]

McMullen et al.

[11] Patent Number: 4,906,193
[45] Date of Patent: Mar. 6, 1990

[54] INTRINSIC PERCEPTUAL MOTOR TRAINING DEVICE

[76] Inventors: James McMullen, 819 S. Franklin St., Mt. Pleasant, Mich. 48858; William Stahl, 610 E. Illinois, Mt. Pleasant, Mich. 48858

[21] Appl. No.: 221,533

[22] Filed: Jul. 19, 1988

[51] Int. Cl.$^4$ .............................................. G09B 19/00
[52] U.S. Cl. ................................. 434/258; 434/112; 434/255; 128/25 R; 128/782; 273/DIG. 27
[58] Field of Search ............... 434/247, 255, 258, 112; 128/782, 25 R; 340/555, 556; 272/70; 273/DIG. 27

[56] References Cited

U.S. PATENT DOCUMENTS

| | | | |
|---|---|---|---|
| 2,290,387 | 7/1942 | Schwartz | 128/782 |
| 3,786,458 | 1/1974 | Horner | 128/782 |
| 4,212,116 | 7/1980 | Hajduch | 434/255 |
| 4,375,674 | 3/1983 | Thornton | 128/782 |
| 4,416,293 | 11/1983 | Anderson | 128/779 |
| 4,563,005 | 1/1986 | Hand | 273/26 |
| 4,577,863 | 3/1986 | Ito | 273/26 |
| 4,600,016 | 7/1986 | Boyd | 128/782 |
| 4,631,676 | 2/1986 | Pugh | 128/782 |
| 4,633,237 | 12/1986 | Tucknott et al. | 128/782 |
| 4,667,685 | 5/1987 | Fink | 128/782 |
| 4,728,100 | 3/1988 | Smith | 272/93 |

*Primary Examiner*—Edward M. Coven
*Assistant Examiner*—Dean Small
*Attorney, Agent, or Firm*—Terry M. Goldstein

[57] ABSTRACT

A perceptual motor training device uses a non-tactile method of training a patient who has suffered some interruption of his neurological functions to recognize the spatial position and orientation of his body and/or the parts thereof. The device includes an alarm that is activated when a portion of the patient's body moves out of a predetermined test area. The alarm alerts the patient without touching the patient so the patient is forced to use his own internal systems to determine the location and orientation of his body and the parts thereof. The test area is defined by beams and/or fields and can include test areas within the overall test area. The device can also be used in conjunction with the training of gross motor developmental sequences as well.

13 Claims, 5 Drawing Sheets

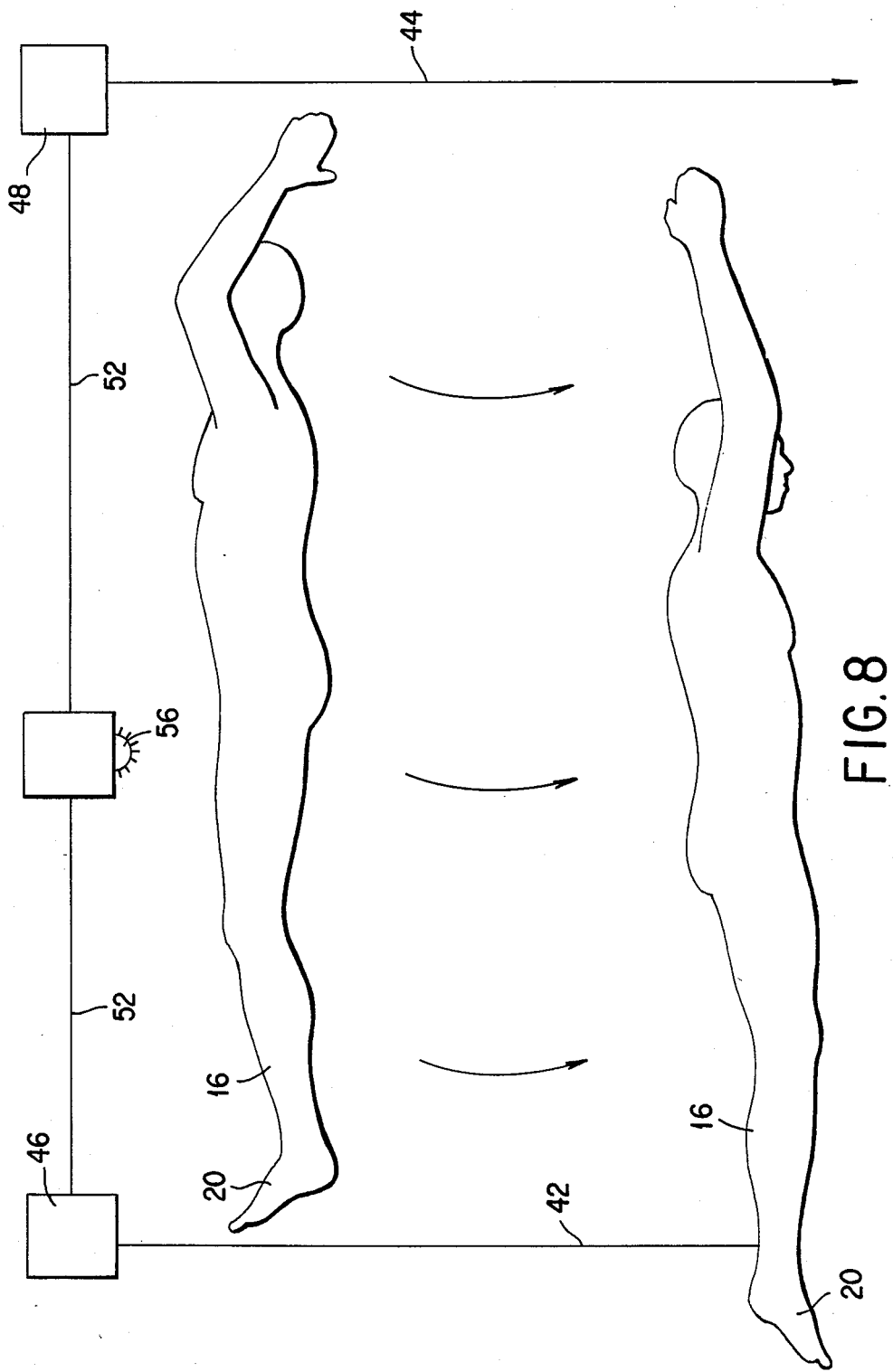

INTRINSIC PERCEPTUAL MOTOR TRAINING DEVICE

TECHNICAL FIELD OF THE INVENTION

The present invention relates to the general field of biomechanics, and in particular to the portion of that field concerning perceptual motor training. Specifically, the present invention relates to a perceptual motor training device and method which retrains a patient to recognize the spatial and orientational position of his body and/or the parts thereof after an interruption of the neurological functions of such patient.

BACKGROUND OF THE INVENTION

If, for some reason, such as injury, insult, surgery, disease, or the like, the neurological functioning of a patient is interrupted, it has been found that such patient loses some portion of his ability to recognize the spatial position and orientation of his body and/or parts thereof with respect to itself and/or the surroundings. It is noted that for the purposes of this disclosure, the term "interruption of neurological functions" is intended to include, not only the occurrences listed above, but any occurrence that affects the neurological or muscularskeletal system of a patient.

This loss of ability is often manifested in a loss of the ability to properly walk, stand, sit, establish and hold proper posture, or to execute gross motor sequential movements, such as rolling and the like. For example, the stroke or disease patient may not be able to walk with a normal gait, or may sit at an angle without knowing of the irregularity. In fact, such a patient may be sitting at an angle with respect to the normal upright orientation, and feel as though he is in a perfectly proper position and orientation, or may walk with an extremely exaggerated leg movement thinking that he is executing a normal gait.

For these reasons, as well as others which will be known to those skilled in the art of biomechanics and perceptual motor training, the field of biomechanics has developed several techniques and devices for retraining such a patient to establish normal body positioning and orientation.

Examples of such techniques and devices include parallel bars, walkers, treadmills, devices attached to the patient, such as electrodes or the like, video cameras, assistants, ice and heat baths and the like.

While all of these known devices and techniques have been somewhat effective, they have not been entirely successful because they do not fully duplicate the real-life conditions to which the patient will be subjected, and thus do not efficiently train the patient in a manner that will permit that patient to adapt to all of the myriad of situations encountered in his normal everyday living so that he can execute normal body movements in those situations to which he may be subjected in real life, even if those particular situations are not the subject of any specific portion of his training. In other words, the present techniques and devices do not efficiently train the patient in a manner which makes that patient fully independent of such devices and techniques, and, as will be discussed below, the patient may actually come to rely on the device and/or technique and not be able to function on his own in the most effective and efficient manner, especially in those situations which have not been duplicated in the training sessions. Furthermore, these devices and techniques are not versatile or mobile enough to satisfy all of the plethora of circumstances which require rehabilitation.

For example, many of the presently available devices and techniques must be located at a rehabilitation center such as in a hospital or the like, and many patients are bedridden and cannot even get to such centers. Still further, such centers do not, and cannot duplicate real-life situations, and thus the patient is subject to conditions in real life that he may not be fully ready for. Since the devices and techniques must be located at specific locations, scheduling problems may occur thereby prohibiting some patients from taking full advantage of a rehabilitation center.

Another disadvantage of such artificial conditions is that many of the techniques and devices are condition-specific. That is, a particular device or technique is designed for a specific condition, such as correcting the patient's gait, and is not effective for other conditions, such as a head position while sitting and/or walking. Not only is this extremely expensive for the rehabilitation center since much more equipment is required, it is not fully efficient since any movement of a patient's body usually involves many different motor skills. The patient is forced to learn an overall movement in bits and pieces which is extremely inefficient and may be discouraging as well. This problem is then exacerbated when the skill is finally learned, and the patient then encounters a different environment in a real life situation, such as in a grocery store, or the like. Learning to walk on a parallel bar device is not the same thing as walking down an aisle at a grocery store.

In addition to the above, and possibly more detrimental to the effectiveness of presently known devices and techniques, is the requirement that all such devices have some sort of physical, or tactile, contact with the patient to signal him of an erroneous motor controlled movement. For example, in such a tactile process, a technician standing next to the patient while that patient learns to stand in an upright position actually physically moves the patient back into a proper position as soon as the patient leans, or an electrode placed on the patient's body causes some sort of signal when that body part is out of normal orientation.

This tactile process has several disadvantages. First, the touching of the body part being trained signals that exact body part externally and excites a portion of the nervous system that is different from the portion of the nervous system used when there is no such external signal. The patient then may learn to wait for the external signal to identify the portion of the body that is in error rather than learning to identify that body part on his own. This slows the learning process.

In addition to slowing the learning process due to the signalling of exactly what portion of the body is in error instead of teaching the patient to identify the error himself, this tactile method may actually teach the patient to rely on being told when he is improperly executing a motor function, and teach him to lean on the assistant, both physically and mentally.

It has been found that due to the reliance on touching, many rehabilitation sessions must go back over the prior sessions, and re-train the patient because the patient has forgotten the prior lessons. It has been found that a retention of learned responses can be as low as twenty percent. Such low retention is extremely inefficient and discouraging to both the patient and to the therapist.

In addition to the above, in some cases, the patient may even have a tactile defensiveness. That is, the patient may actually reject a physical touching.

Again, such tactile procedure does not duplicate the real life conditions to which the patient will be subjected. Having an assistant or a parallel bar or other such physical presence touch and move your leg into the proper position whenever it moves out of such position is not the same as walking from your automobile or standing in a line.

Thus, there is need for a perceptual motor training device and method applicable to efficiently retrain a patient to recognize, using his own, unaided, internal systems, the spatial and/or orientational position(s) of his body and/or the parts thereof after an interruption of the neurological functions of that patient which is versatile and which duplicates real-life situations so as to efficiently teach a patient to identify, using his own internal systems, the various parts of his body being moved and controlled and to efficiently make a patient independent of the training device and/or technique.

OBJECTS OF THE INVENTION

It is a main object of the present invention to provide a perceptual motor training device and method for use in retraining a patient who has suffered some sort of interruption to his neurological functioning to recognize the spatial and orientational position of his body and/or the parts thereof which is versatile and which efficiently duplicates real-life situations in a manner that efficiently teaches the patient to rely on his own internal systems to control his motor functions.

It is another object of the present invention to provide a perceptual motor training device and method for use in retraining a patient who has suffered some sort of interruption to his neurological functioning to recognize the spatial and orientational position of his body and/or the parts thereof which is versatile and which efficiently duplicates real-life situations in a manner that efficiently teaches the patient to rely on his own internal systems to control his motor functions and in a manner that prevents the patient from learning to depend on the device or technique to execute a motor controlled bodily function.

It is another object of the present invention to provide a perceptual motor training device and method for use in retraining a patient who has suffered some sort of interruption to his neurological functioning to recognize the spatial and orientational position of his body and/or the parts thereof which is versatile and which efficiently duplicates real-life situations in a manner that efficiently teaches the patient to rely on his own internal systems to control his motor functions and which encourages a high retention of a learned skill.

It is another object of the present invention to provide a perceptual motor training device and method for use in retraining a patient who has suffered some sort of interruption to his neurological functioning to recognize the spatial and orientational position of his body and/or the parts thereof which is versatile and which efficiently duplicates real-life situations in a manner that efficiently teaches the patient to rely on his own internal systems to control his motor functions and which is mobile.

It is another object of the present invention to provide a perceptual motor training device and method for use in retraining a patient who has suffered some sort of interruption to his neurological functioning to recognize the spatial and orientational position of his body and/or the parts thereof which is versatile and which efficiently duplicates real-life situations in a manner that efficiently teaches the patient to rely on his own internal systems to control his motor functions and which is usable even if the patient has a tactile defensiveness.

It is a specific object of the present invention to provide a perceptual motor training device and method for use in retraining a patient who has suffered some sort of interruption to his neurological functioning to recognize the spatial and orientational position of his body and/or the parts thereof which is versatile and which efficiently duplicates real-life situations in a manner that efficiently teaches the patient to rely on his own internal systems to control his motor functions and in a manner that does not require the use of any tactile signals to be given to the patient.

SUMMARY OF THE INVENTION

These, and other, objects are accomplished and achieved by a perceptual motor training device and method which uses an intrinsic training technique to retrain a patient who has had some interruption of his neurological system to recognize the spatial position and orientation of his body and/or the parts thereof.

For the purposes of this disclosure, the term "intrinsic" means a response that is caused by elements and systems that are located within a patient's body without the use of any physical touching. That is, in an intrinsic technique, the patient is taught to control his motor functions without using any physical contact with the patient. Stated still another way, the intrinsic technique is non-tactile in nature in that it does not rely on any physical touching of the patient by the device, or any part thereof, or by an attendant, to carry out the perceptual motor training of the patient. In such an intrinsic technique, therefore, the patient is taught various skills, such as walking, without touching the patient in any manner and teaches the patient to use his own internal senses and systems to identify and control the body parts being used to execute the particular motor function, such as walking, sitting, standing, rolling or the like. The intrinsic technique teaches the patient to rely on his own sense of self-awareness.

The intrinsic technique is carried out by using a beam or field which defines a test area located, divided and oriented in any plane according to the particular patient motor function or combination of motor functions being trained or tested. The patient is positioned in the test area and attempts to execute the particular motor function or functions of interest, e.g., kneeling, within that test area. As soon as one portion of the patient's body associated with the motor function of interest leaves the test area, the beam is interrupted or the field is disturbed. A non-tactile alarm, such as an audible or visual signal is connected to the beam or to the field and is activated as soon as the beam is interrupted or as soon as the field is disturbed to alert the patient, without any physical contact with that patient, that some part of his body has executed some movement or positioning that is not proper for the instant motor function of interest.

The test area can be subdivided into as many different portions as necessary to carry out any particular test or activity divised by the physical therapist. That is, the test area can be, for example, a unitary path, a path with a turn, or several different paths with various turns, twists and other changes of direction and/or orientation, both vertical orientation and/or horizontal orientation as well as angular orientation as devised by the physical therapist. The test area size, shape, composition, orientation and the like are only limited by the imagination of the physical therapist. The test area can also include various different activities in addition to the basic activities being tested if desired. Each of the activities can also be monitored in the non-tactile manner of the present invention. Accordingly, while certain test areas are disclosed herein, the invention is not intended to be limited by the exact test area shapes, sizes, compositions, and orientations disclosed herein, and is intended to include any such test area as will occur to one skilled in the art based on the teaching of the present disclosure.

The beam can be an electromagnetic beam, such as a beam of visible light such as used in the so-called "electric eyes" used in conjunction with automatic door openers, or the like, and the field can be similar to those used to detect presence in a burglar alarm situation or in an automatic door opener.

In this manner, the patient is not touched to signal him that an improper response has been executed by his body or some part thereof. This avoids the above-mentioned problems associated with the devices that use a tactile signal, such as a parallel bar or an electrode placed on the patient, since these tactile devices stimulate the patient's sense of touch and permit him to use that sense of touch to identify the body part that he is attempting to learn to control. Without such physical touching, the patient must learn to use his own sense of self awareness to identify the body part and its orientation and spacing with respect to his body and to move and correct such orientation and spacing—without the aid of his sense of touch to identify such body part.

Therefore, this non-tactile signalling technique teaches the patient to rely on his own sense of self-awareness since there is no physical contact to signal the touch portion of his nervous system as to what particular portion of his body is in error. The patient is taught to identify, using his own internal senses, what portion of his body is in error.

By teaching the patient to rely on his own internal sense of body location and orientation, the patient is not restricted to any particular condition since he is operating within a "closed system", i.e., his own body and its own awareness systems. He is thus able to function in any exterior system or environment since he has been trained to rely on an internal system of signals and senses.

Accordingly, the patient can function in the many real-life situations that may not have been covered in his training since he is not situation-dependent or external-situation dependent for his motor control. Stated in another manner, the patient is taught to, for example, walk, by teaching him to use his own internal senses to recognize the spatial position and orientation of his legs, arms, trunk and head during a walking motion with no external physical signals being given to him to help him identify which portion of his body may be in error. This internal sensing is applicable to any external situation, be it the rehabilitation center itself, a grocery store, a classroom or the like.

The system is quite versatile since it is operating on the patient's own internal systems, and each signal reinforces other taught skills. That is, each signal really is making the patient aware of his own internal self-awareness system, and thus, no matter whether the patient is being taught specifically to control his legs or specifically to control his arms, or specifically to control his trunk, the overall and ultimate effect is to make the patient more aware of his own internal systems. Thus, the teaching and training of each individual skill reinforces the teaching and training associated with other skills not being specifically taught at that particular training session. Each individual training session reinforces and reiterates all prior training sessions and pretrains the patient for all future training sessions. Learned response retention is thus increased dramatically over that retention associated with the prior art due to the constant reinforcement, reviewing and previewing associated with the technique and device of the present invention.

The ultimate effect is a technique that is adaptable to virtually any retraining need, and which trains the patient in a manner that enables him to deal with situations for which he has not been specifically trained. That is, the patient may walk in the rehabilitation center, and also walk in a grocery store with other people and objects in close proximity to him since he has been taught to rely only on his own internal systems and not any particular system or device that exists only in the rehabilitation center.

The system is also extremely mobile since it does not rely on any large and condition-specific devices, and the same system can be used to rehabilitate a wide variety of patient problems. Thus, the technique of the present invention is not constrained to use only in a rehabilitation center, but can be used nearly anywhere, even in the home of a bedridden patient. This frees the therapist and the patient from the economic, logistical, locational, scheduling and organizational confines and limitations imposed by the prior art devices and techniques.

Since there is no physical touching involved in the present technique, there is no problem associated with either having the patient becoming physically or mentally dependent on an assistant or with a patient who may have some form of tactile defensiveness.

BRIEF DESCRIPTION OF THE FIGURES

Other objects and advantages of this invention will become apparent from the following description taken in conjunction with the accompanying drawings wherein are set forth, by way of illustration and example, certain embodiments of this invention.

The drawings constitute a part of the present invention and illustrate various objects and features thereof.

FIG. 8 is a top plan view showing the system embodying the present invention used in a technique training a patient to perform a gross motor developmental sequence of movements, such as rolling, with the patient being shown as having executed the movement in an erroneous manner so that he is in a location that is erroneous and which will activate a non-tactile alarm to alert the patient of the error.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
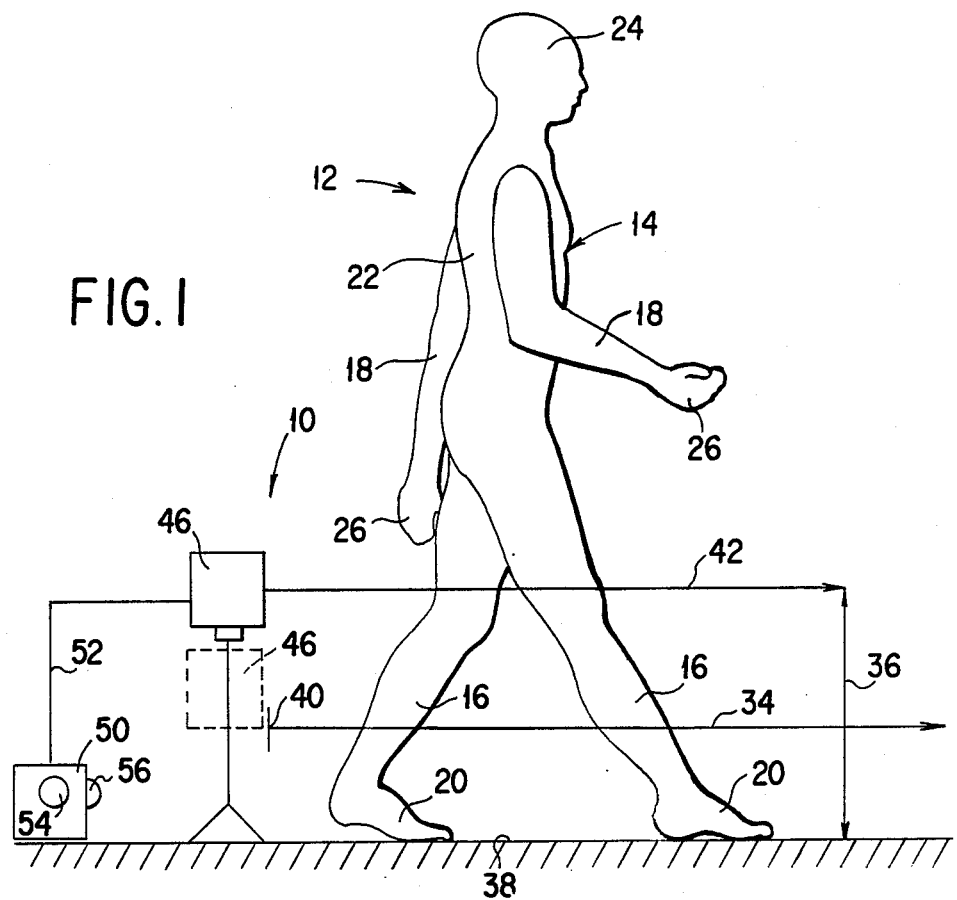
FIG. 1 is a side elevational view showing the system embodying the present invention in a technique for teaching a patient to walk, with the system including means, such as a beam generator or a field generator being used to define a test area, in this case, a walking path.
Figure 2:
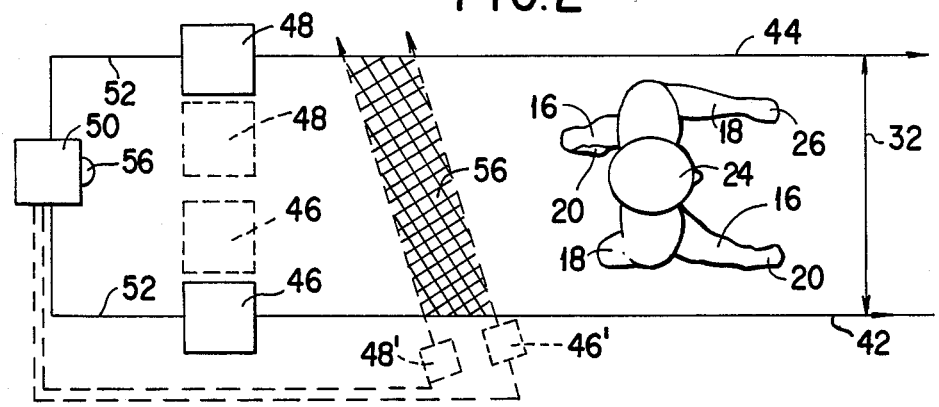
FIG. 2 is a top plan view of the system set up shown in FIG. 1.

Shown in FIGS. 1 and 2 is a perceptual motor training device 10 for retraining a patient 12 after interruption of the neurological functions of such patient 12 by intrinsically training that patient 12 to recognize the spatial position and/or orientation of his body 14 and/or the parts thereof, such as his legs 16, his arms 18, his feet 20, his trunk 22, his head 24, his hands 26, or any other parts of his body as is known to those skilled in the art, with respect to the remainder of his body. It is noted that FIGS. 1 and 2 have been drawn to illustrate the walking process, and thus do not exactly agree.

The device 10 includes a means 30 for defining a test area, such as path 32 which is being traversed by the patient 12 in FIGS. 1 and 2. The test area has the spatial limits, such as the width 32, the length 34 and the height 36 as well as the orientation thereof, which is shown as being horizontal in axial length and as being vertical in height as measured from the floor 38, prescribed according to the desired functional and operational requirements of the particular motor function for which the patient is being retrained and/or tested, in the case shown in FIGS. 1 and 2, walking. The test area shown in FIGS. 1 and 2 has an axial extent of undetermined length beginning at origin 40, but could be made finite as will be discussed below with regard to FIGS. 3 and 4.

The test area is defined by beams or field extremities, as will be discussed below, and such test area extremities are shown in FIGS. 1 and 2 by reference indicators 42 and 44. The beams and/or fields are generated by generators 46 and 48 which are adjustable in at least two planes, such as the vertical plane indicated in single chain dots in FIG. 1, as well in the horizontal plane as is indicated in the double chain dots in FIG. 2. Other adjustments, such as angular can be made as well to orient the test area as necessary. The generators are connected to a control/alarm unit 50 by leads 52, and the control/alarm unit 50 includes an audible alarm 54, such as a bell and/or a visual alarm 56, such as a light. The control/alarm unit 50 has suitable circuitry for operating and controlling the generators 46 and 48, and for setting the intensity of both the test area extremities and the alarm as necessary. Those skilled in the art will understand what circuit elements are to be included in the unit 50, and thus the exact nature of such elements will not be discussed.

The extremity defining means indicated at 42 and 44, the generators 46 and 48, the circuitry in unit 50 coupling the generators 46 and 48 to the alarm means and the alarm means itself combine to form a means for determining when the spatial position and/or orientation of the patient's body and/or parts thereof is in error with regard to a desired spatial position and/or orientation in the particular retraining and/or testing, and signalling the patient in a non-tactile manner whenever a portion of the patient's body moves out of the test area. Thus, for example, during a gait training procedure, should one of the patient's legs swing in an undesired manner, that leg will move out of the test area and break the beam or disturb the field as defined by the extremity indicators 42 and 44. If a field is used, such field will extend from the floor 38 to the desired height and any movement of the leg outside of the path will disturb the field. On the other hand, should a beam be used, the height of the beam is set and the leg can move under that beam without interrupting the beam, but will interrupt the beam if it breaks the beam. The beam is thus set by the therapist according to the particular parameters of the training process.

Once the field is disturbed, or the beam interrupted, the generators have a signal generating means therein to indicate that the field has been disturbed or the beam interrupted in the manner common to electric eyes or sensors as will be known to those skilled in the art. Such signal is sent by the generator sensing the break or interruption to the control unit 50. The control circuitry in the control unit 50 then activates the alarm selected by the therapist, be it a visual alarm or an audible alarm, and sets the intensity of that alarm according to the intensity preselected by the therapist.

The patient is thus signalled in a non-tactile, non-physical manner that some portion of his body has executed an undesired movement. The patient must then identify the part of his body that is in error—without the aid of his sense of touch—and correct such error. The patient is thus forced to sharpen his sense of self-awareness using his own internal sensing system. The test area can be set to detect arm movement as well as leg movement and head movement in addition to these, or any combination thereof by using an appropriate number of generators which are strategically placed and oriented along the test area perimeter. Thus, while only two generators are shown in FIGS. 1 and 2, any number of generators can be used. For example, two additional generators can be oriented at an angle to the axial extent of the test area as indicated by the reference line 34 to define a test area within the test area. These two additional generators can be horizontally oriented as are the generators 46 and 48 or they can be angled with respect to the vertical if so desired. In this manner, the test area can be precisely defined according to the exact needs of the particular procedure being conducted, and can be customized for a particular patient so each patient can be treated in the manner that is most efficient and effective for him. This customizing of the test area also permits a complicated gross motor sequence to be precisely monitored as it occurs, and will permit the therapist to devise and accurately monitor any number of operations. To indicate this customizing of the test area, FIG. 2 includes a test area section 56 which has been defined by additional generators 46' and 48' which are suitably connected to the control unit 50 and are oriented at an angle with respect to the axial extent of the test area. The test area section 56 can be located above the test area as defined by the extremities 42 and 44 to monitor the movement of the patient's head or shoulders or any other upper body portion during a prescribed portion of the overall test. As many test areas as necessary can be defined in this manner, and the limits of such test area customizing are only set by the limits of the therapist's imagination, thereby freeing the therapist to devise the most effective and efficient tests that he can. He is no longer limited by what his equipment can do.

In this manner, the patient can be taught to identify any extremity that is in error during a single test, not just the particular extremity of interest to that particular test. As discussed above, all of the signals will sharpen the patient's sense of self-awareness, and thus he is being taught about the totality of his system, not just a single part thereof.

As will occur to those skilled in the art based on the teaching of this disclosure, the beams can be of any suitable make-up such as electromagnetic energy including, but not limited to: infrared energy; ultraviolet energy; visible radiation; microwaves; laser beams and the like. Any of these forms of a beam can be used, or a combination thereof can be used if suitable.

If a beam is used, it may require the focusing of the beam from the generators onto a target and the reflection back to a sensor in that generator in the fashion of radar. An example of such a set up is shown in FIGS. 3 and 4, and attention is now directed to such figures for the ensuing discussion.

Figure 3:
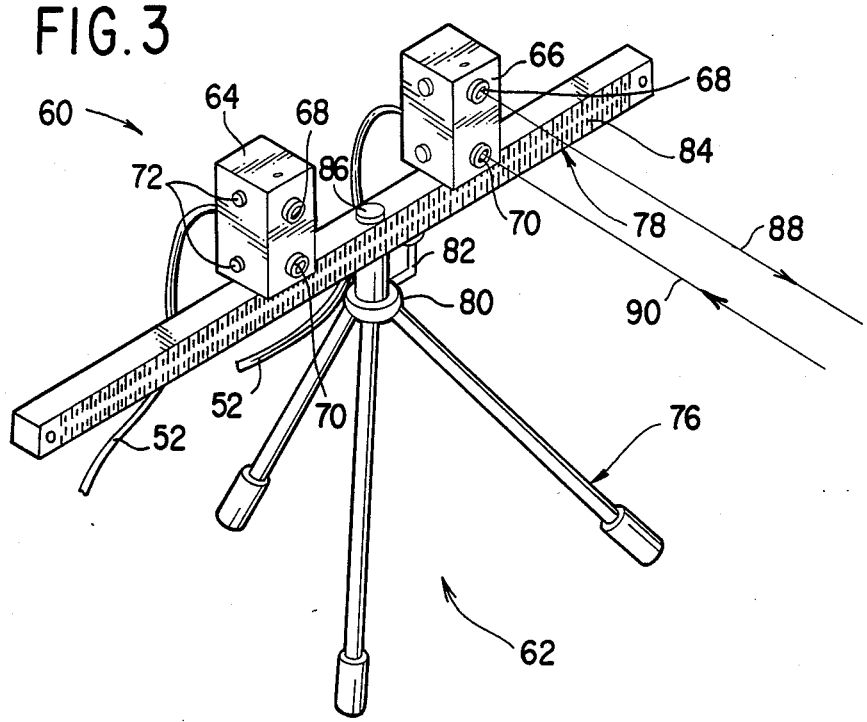
FIG. 3 is a perspective view of a beam generating device used in conjunction with the system embodying the present invention.
Figure 4:
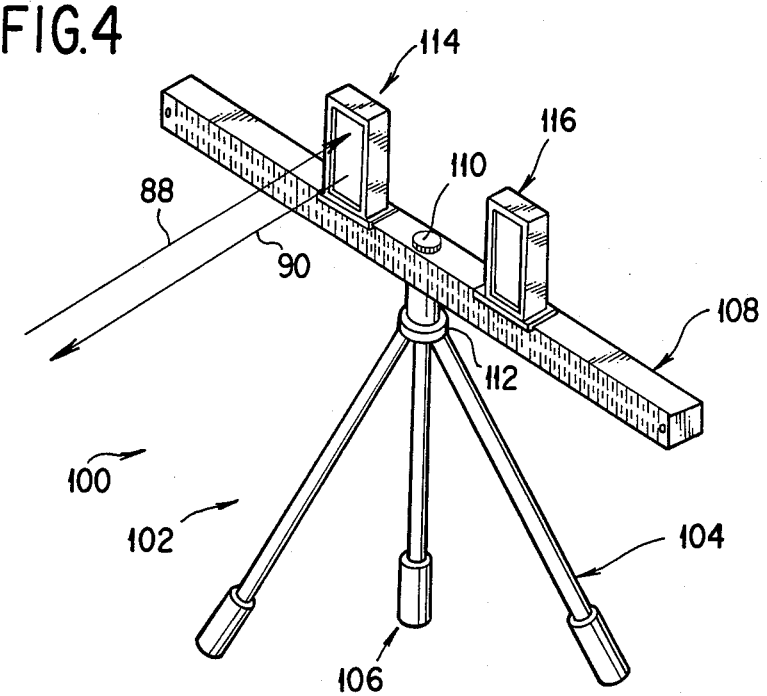
FIG. 4 is a perspective view of a portion of a beam generating device used in conjunction with the system embodying the present invention.

The means for generating a reference beam to define a test area shown in FIGS. 3 and 4 includes a beam generator 60 having a base 62 on which are mounted two generators 64 and 66 each of which is connected to the control unit 50 by the leads 52.

Each generator 64 and 66 includes a beam projector 68 and a reflected beam sensor 70 and suitable controls as indicated at 72 on generator 64. As indicated in FIG. 3, the base 62 can include a plurality of adjustable legs, such as leg 76, which cooperate to form a tripod-like structure. The base 62 also includes a mounting bar 78 which is affixed to the top of the tripod legs by means of an adjusting nut 80 whereby the height of the mounting bar 78 can be varied as indicated in FIG. 1 by the dotted line representation of the generator 46. A supporting bracket 82 can also be included to ensure stable support for the mounting bar. The mounting bar can also include suitable calibration, such as scale 84 to permit the therapist to further control the procedure. The mounting bar 78 is rotatably mounted on the base by a pivot pin 86 to permit the beams to be moved angularly with respect to the test area, and the generators 64 and 66 can also be rotatably mounted on the mounting bar to permit further calibration of the device.

As is indicated by the beams 88 and 90 in FIG. 3 on the generator 66, a beam 88 is sent out by the projector 68 and a reflected beam 90 is sensed by the sensor 70. Any interruption of either beam 88 or beam 90 will be sensed by the internal circuitry in the generator 66 and an appropriate signal sent to the unit 50 for activating a suitable alarm.

A suitable beam reflector unit 100 is shown in FIG. 4 and includes a base 102 of the tripod type so as to include legs 104 having shoes 106 thereon and which support a calibrated mounting bar 108 via a pivot pin 110 and an adjusting nut 112 in the manner discussed above with regard to the unit 62. Movably mounted on the mounting bar 108 are a pair of reflector units 114 and 116 which are mounted on the bar 108 in a location to reflect an incident beam, such as beam 88 as reflected beam 90 and to thus cooperate with the generators 64 and 66 to define the extremities 42 and 44 of the test area. The location and orientation of the reflector unit 102 is set according to the location and orientation of the generator unit 62 as will occur to those skilled in the art based on the teaching of this disclosure. The reflector unit is not shown in the figures for the sake of brevity and to further emphasize the undefined nature of the test areas, but could be included in any or all of these setups if suitable.

As discussed above, the beams 88 and 90 can be any suitable form, such a electromagnetic energy or the like.

An alternative to the use of a beam is a field having the extremities thereof located and oriented to define the test area. Such a field can be in the nature of those fields used in the detection of presence, such as in burglar alarm systems, door opening systems, proximity sensors or the like. Examples of such systems are disclosed in patents, such as U.S. Pat. Nos. 4,742,549, 4,326,197, 4,625,199, 4,382,252, the disclosures of which are all incorporated herein by reference.

As discussed above, the device 10 is used in a wide variety of situations for a wide variety of training situations. Several of these training situations are shown in FIGS. 5-8, and it is noted that these figures not only show an individual training situation, but the combination of such figures indicates movement from one position to another.

Figure 5:
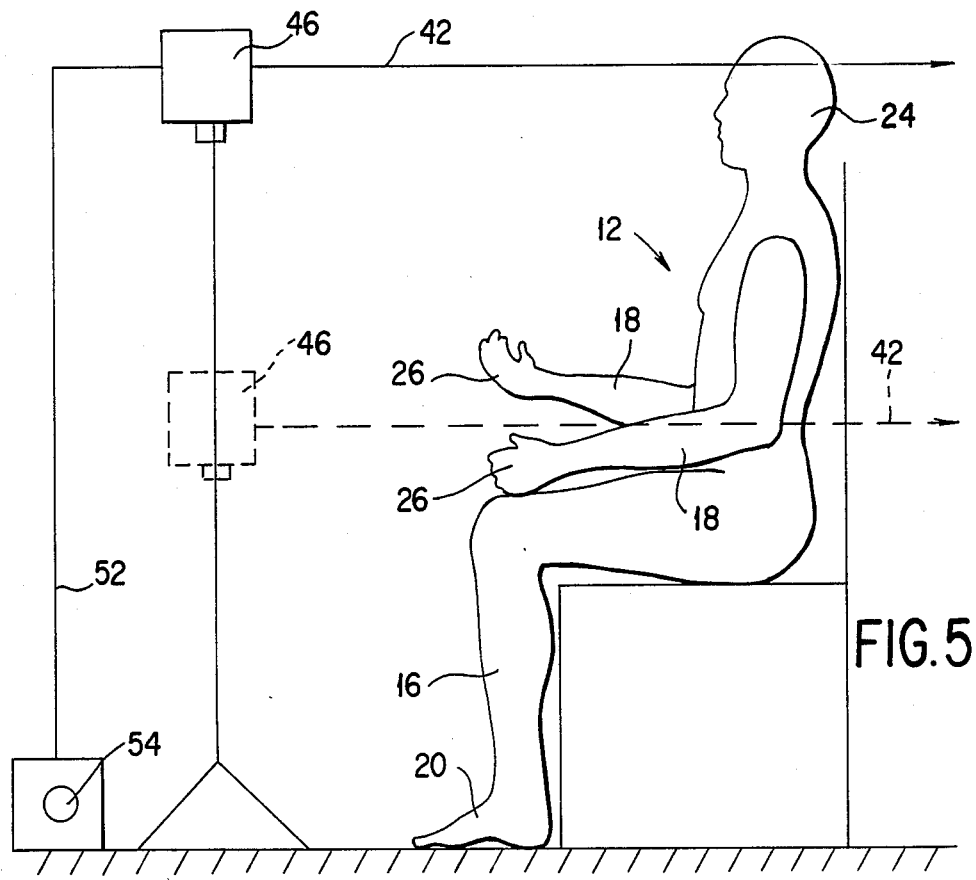
FIG. 5 is an elevational view of the system embodying the present invention being used to train a patient to sit.
Figure 6:
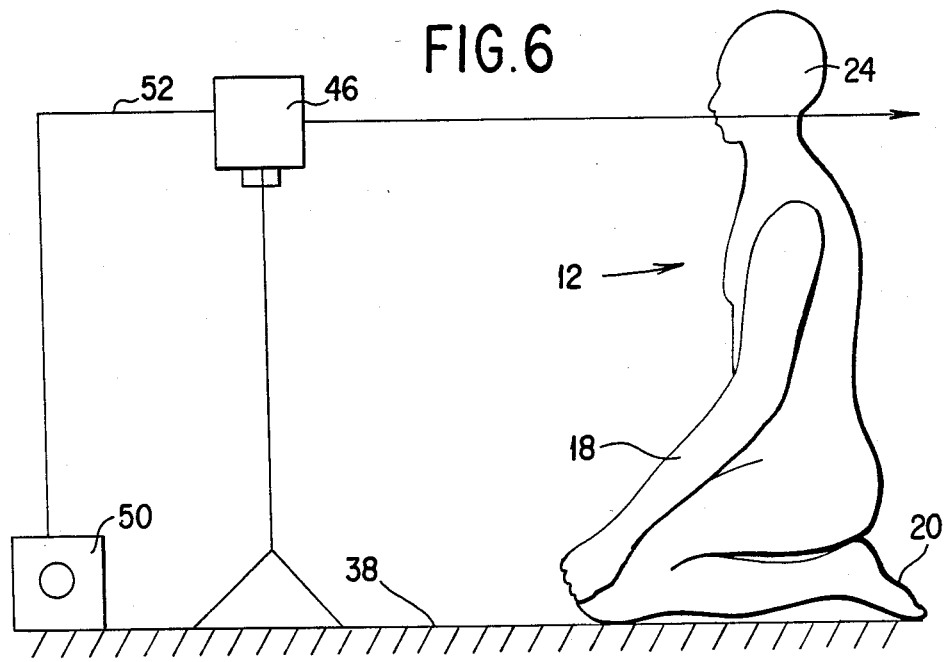
FIG. 6 is an elevational view of the system of the present invention being used to train a patient to kneel.

Thus, for example, FIG. 5 shows a patient in a sitting position, and the device 10 being used to monitor the spatial position and orientation of the patient's arms and/or his head. FIG. 6 shows a patient in a kneeling position with the device being used to monitor the position and orientation of the head, but could be used to monitor any other portion of the patient's body.

Figure 7:
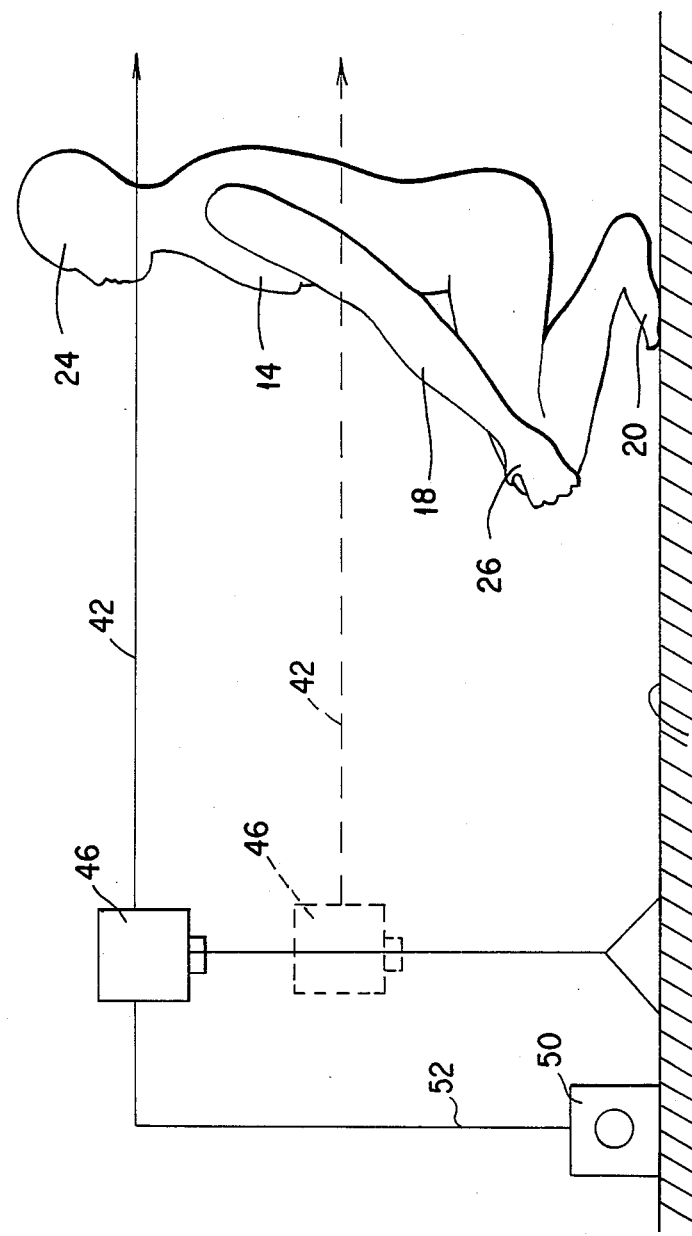
FIG. 7 is an elevational view of the system embodying the present invention being used in a technique training a patient to squat.

FIG. 7 shows the device being used to monitor a patient in a squatting position, with the device monitoring the patient's arms and/or head.

The device can also be used to monitor and train a patient's gait, as is indicated in FIGS. 1 and 2.

Still further, the device can be used to train a patient to perform a gross motor developmental sequence of movements, such as rolling as is indicated in FIG. 8. This gross motor sequence can include rolling from supine position to a prone position. For the sake of clarity, FIG. 8 shows the patient moving out of the test area while he executes the rolling movement indicated by the arrows R in FIG. 8. As shown in FIG. 8, the patient's foot 20 has moved out of the test area as defined by the extremity 42, and thus is shown as breaking the beam or disturbing the field. Such beam breaking or field disturbance will cause an alarm so as to warn the patient that he has executed an improper movement.

These gross motor sequences can be a wide variety of different movements, and can include, but are not limited to the following movements: supine-to-prone and supine-to-side and supine-to-side sitting as indicated in the movement shown in FIG. 8; side sitting-to-kneeling as indicated by comparing FIGS. 8 and 6; kneeling-to-half kneeling as can be seen from FIG. 6; half kneeling-to-standing as can be seen be comparing FIGS. 6 and 1; and the reverse of each of these movements.

Variations of the various test areas and the inclusion of several test areas as above discussed can also be used in conjunction with the just-discussed gross motor sequence training steps if suitable.

It is to be understood that while certain forms of the present invention have been illustrated and described herein, it is not to be limited to the specific forms or arrangement of parts described and shown.

We claim:

1. A perceptual motor training device comprising:
   means for retraining a patient after interruption of the neurological functions of such patient by intrinsically training that patient to recognize the spatial position and orientation of a particular body part relative to other parts of his body, said means including
   test area defining means for defining a test area which has the spatial limits and orientation thereof prescribed according to desired spatial limits of the particular body part relative to the other parts of his body for a particular motor function for which the patient is being retrained and/or tested, said test area defining means including two first reference beam generators for defining a first portion of said test area and at least one second reference beam generator positioned above said first reference beam generators to define a second portion of said test area above said first portion of said test area, and
   means for determining when the spatial position and/or orientation of the particular body parts relative to the other parts of that patient's body are in error with regard to a desired spatial position and/or orientation of the particular body parts relative to the other parts of the patient's body in the particular retraining and/or testing and signalling the patient in a non-tactile manner whenever the particular body part of the patient's body associated with the particular motor function being tested and trained moves out of the test area.

2. The perceptual motor training device defined in claim 1 wherein said means for defining a test area includes a beam receiving means.

3. The perceptual motor training device defined in claim 2 wherein said beam includes electromagnetic energy.

4. The perceptual motor training device defined in claim 2 wherein said beam includes infrared energy.

5. The perceptual motor training device defined in claim 2 wherein said beam includes ultraviolet radiation.

6. The perceptual motor training device defined in claim 2 wherein said beam includes visible radiation.

7. The perceptual motor training device defined in claim 2 wherein said beam includes microwaves.

8. The perceptual motor training device defined in claim 2 wherein said beam is a laser beam.

9. The perceptual motor training device defined in claim 1 wherein said means for determining when the spatial position and/or orientation of the patient's body and/or parts thereof is in error includes an audible signal generating means.

10. The perceptual motor training device defined in claim 1 wherein said means for determining when the spatial position and/or orientation of the patient's body and/or parts thereof is in error includes a visible signal generating means.

11. The perceptual motor training device defined in claim 1, further including beam reflector means oriented and located to cooperate with said reference beam generating means to reflect said reference beams along predetermined paths.

12. The perceptual motor training device defined in claim 11, further including means for adjusting said beam generating means and means for adjusting said beam reflector means.

13. The perceptual motor training device defined in claim 12, wherein both of said adjusting means include means for adjusting said beam generating means and said reflector means horizontally, vertically and angularly.

* * * * *